(12) United States Patent
Jones et al.

(10) Patent No.: US 8,235,445 B2
(45) Date of Patent: Aug. 7, 2012

(54) VEHICLE SEAT ON DEMAND

(75) Inventors: Thomas A. Jones, Macomb, MI (US);
Therese A. Tant, Royal Oak, MI (US);
James T. Embach, Rochester Hills, MI (US); Kurt D. Zeile, Lake Orion, MI (US); Michael J. Richardson, Azle, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 111 days.

(21) Appl. No.: 12/638,016

(22) Filed: Dec. 15, 2009

(65) Prior Publication Data

US 2010/0194135 A1 Aug. 5, 2010

Related U.S. Application Data

(60) Provisional application No. 61/148,569, filed on Jan. 30, 2009.

(51) Int. Cl.
*B60N 2/30* (2006.01)
*B60N 2/02* (2006.01)

(52) U.S. Cl. .................. 296/65.03; 296/65.01; 296/66; 297/230.11; 297/223

(58) Field of Classification Search ............... 296/65.01, 296/67, 65.02, 65.18, 66, 65.03; 297/228.13, 297/223, 229, 230.11
See application file for complete search history.

(56) References Cited

U.S. PATENT DOCUMENTS

| | | | |
|---|---|---|---|
| 3,419,309 A | 12/1968 | Smith | |
| 4,040,655 A * | 8/1977 | Garrick et al. | 296/63 |
| 4,600,238 A * | 7/1986 | Goodford | 297/219.1 |
| 4,768,830 A | 9/1988 | Musselwhite | |
| 5,029,928 A | 7/1991 | Huber | |
| 5,078,443 A | 1/1992 | Austin | |
| 5,342,111 A | 8/1994 | Charles | |
| 5,806,910 A * | 9/1998 | DeRees | 296/63 |
| 5,879,053 A | 3/1999 | Lux et al. | |
| 6,631,946 B1 * | 10/2003 | Neale | 297/15 |
| 6,912,748 B2 | 7/2005 | VanSickle | |
| 7,413,249 B2 | 8/2008 | Leutert | |
| 7,637,553 B2 | 12/2009 | Conlon et al. | |

FOREIGN PATENT DOCUMENTS

| | | |
|---|---|---|
| DE | 112006001302 T5 | 4/2008 |
| DE | 102007023370 A1 | 11/2008 |
| ES | 2254034 A1 | 1/2006 |
| FR | 2588171 A1 | 4/1987 |
| GB | 2442532 A | 9/2008 |

* cited by examiner

*Primary Examiner* — Glenn Dayoan
*Assistant Examiner* — Melissa A Black
(74) *Attorney, Agent, or Firm* — Quinn Law Group, PLLC

(57) ABSTRACT

A vehicle is provided with on-demand seating to allow maximum cargo space in the passenger compartment when the seats are not needed. The seating is lightweight and compact, maximizing available cargo space and minimizing mass and fuel economy impact. The flexible seat may be stowed within body structure defining the passenger compartment, such as side trim panels or a vehicle floor. The body structure supports the flexible seat in a deployed position in which the flexible seat extends from the body structure into the passenger compartment. Roller mechanisms mounted within the body structure allow the seat to extend and retract from the passenger compartment. The seats may be inflatable, and may include pneumatic foam.

7 Claims, 4 Drawing Sheets

US 8,235,445 B2

VEHICLE SEAT ON DEMAND

CROSS-REFERENCE TO RELATED APPLICATIONS

This application claims the benefit of U.S. Provisional Patent Application No. 61/148,569, filed Jan. 30, 2009, which is hereby incorporated by reference in its entirety.

TECHNICAL FIELD

This application relates to a vehicle seat.

BACKGROUND OF THE INVENTION

Automotive vehicles are becoming more customizable in order to meet the values and priorities of customers. Vehicle owners generally desire flexibility to reconfigure a vehicle to meet their specific needs. For example, customers appreciate the ability to fold down rear seats in order to provide more rear cargo space. Fuel economy considerations are also important to most vehicle owners.

SUMMARY OF THE INVENTION

A vehicle is provided with "on-demand" seating, i.e., seats that are available only when needed. This allows maximum cargo space in the passenger compartment when the seats are not needed. The seat is lightweight and compact, maximizing available cargo space and minimizing mass and fuel economy impact. The seat is flexible, so that it may be stowed within body structure defining the passenger compartment, such as side trim panels or a vehicle floor. The body structure supports the flexible seat in a deployed position in which the flexible seat extends from the body structure into the passenger compartment. Roller mechanisms mounted within the body structure allow the seat to extend and retract from the passenger compartment. The seat may be inflatable, and may include pneumatic foam.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
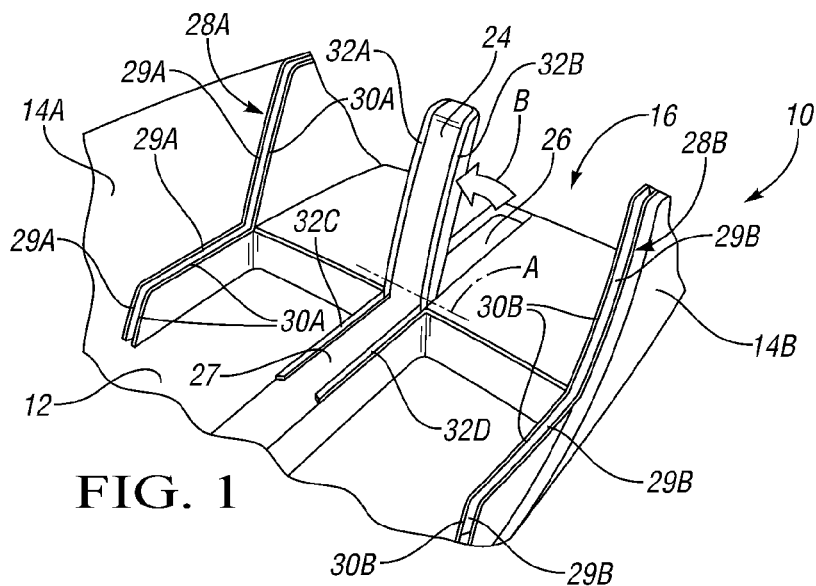
FIG. 1 is a schematic perspective illustration in fragmentary view of a first embodiment of a vehicle having on demand seats.

Referring to the drawings, wherein like reference numbers refer to like components throughout the several views, FIG. 1 shows portion of a vehicle 10. Specifically, body structure including a load floor 12 and opposing side trim panels 14A, 14B are illustrated. The load floor 12 and side panels 14A, 14B partially define a passenger compartment 16. A rear portion of the passenger compartment 16 is shown in FIG. 1, representing an area behind a driver seat and a front passenger seat (not shown).

Figure 2:
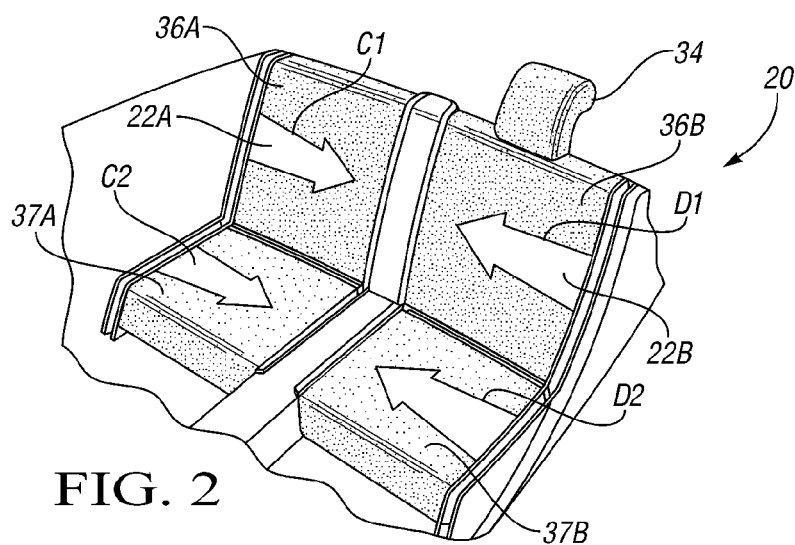
FIG. 2 a schematic perspective illustration in fragmentary view of the vehicle of FIG. 1, with the seats in a deployed position.
Figure 3:
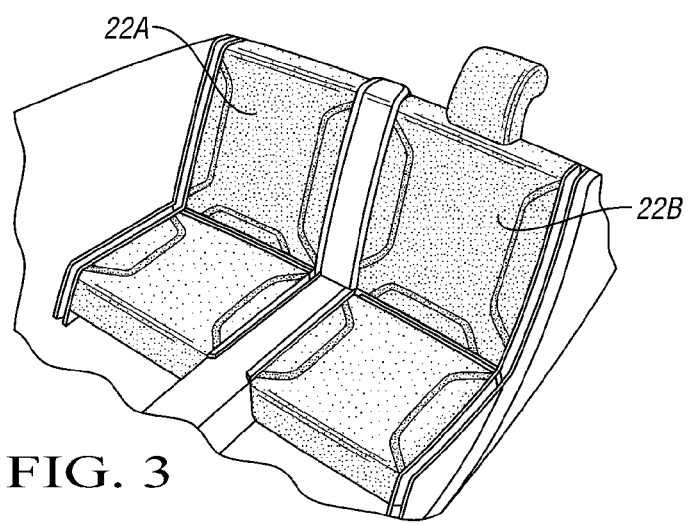
FIG. 3 is a schematic perspective illustration in fragmentary view of the vehicle of FIGS. 1 and 2.

The vehicle 10 has a vehicle seat assembly 20 that includes two seats 22A. 22B (stowed in FIG. 1, but shown deployed in FIGS. 2 and 3) referred to herein as "seats on demand". Although two seats 22A, 22B are shown, in alternative embodiments only one such seat may be provided, or an additional row of similar seats may also be provided. Each seat 22A, 22B includes a seat back 36A, 36B and a seat bottom 37A, 37B. The respective seat backs 36A, 36B and seat bottoms 37A, 37B may be separate components, separately extendable on respective rollers of roller mechanisms 28A, 28B, or may be integrated to form a single continuous seat that is extendable in one motion. As shown in FIG. 1, the vehicle 10 is configured so that the seats 22A, 22B may be retracted into side trim panels 14A, 14B, to free cargo space in the passenger compartment. Alternatively, the seats 22A, 22B may be deployed, as shown in FIGS. 2 and 3, to provide "on demand" second or third row seating. The seats 22A, 22B may be flexible, frameless fabric panels, and may be a single layer, or multiple layers that may or may not be inflatable.

Referring again to FIG. 1, a support member 24 is pivotably secured to the floor 12, and is shown pivoted about pivot axis A, as indicated by arrow B, to a use position. In a stowed position, the support member is generally contiguous with the surrounding floor 12, and resides in and covers the cavity 26. A raised portion 27 of the floor 12, such as a battery tunnel, is located forward of the support member 24.

The vehicle includes roller mechanisms 28A, 28B secured to the respective side trim panels 14A, 14B. The roller mechanisms 28A, 28B include multiple spring-biased rollers that are hidden from view, as they are nested within the trim panels 14A, 14B and the outer casings 29A, 29B that are shown. Separate roller mechanisms may be used for the seat back portions 36A, 36B and seat bottom portions 37A, 37B of seats 22A and 22B. Those skilled in the art will readily understand the function of spring-biased rollers to roll and unroll a generally sheet-like material. Such rollers are commonly used to roll and unroll window shades. A side edge of the seat 22A, 22B is secured to the roller mechanisms 28A, 28B. The outer casings 29A, 29B and the side trim panels 14A, 14B each form a respective slot 30A, 30B that allows the seats 22A, 22B to extend from the roller mechanisms 28A, 28B into the passenger compartment 16. In FIG. 1, the seats 22A, 22B are retracted by the rollers of roller mechanisms 28A, 28B such that they are rolled within the trim panels 14A, 14B and casings 29A, 29B. Pull tabs (not shown) may extend through the slots 30A, 30B into the passenger compartment 16 when the seats 22A, 22B are in the stowed position to allow easy access to the seat 22A, 22B for manually unrolling the seats 22A, 22B to the deployed positions shown in FIGS. 2 and 3. In the deployed positions, the seats 22A, 22B extend laterally to span the space between the side trim panels 14A, 14B and the raised portion 27 and support member 24.

As shown in FIG. 1, the vehicle 10 includes fixtures 32A-32D mounted to the floor 12 and to the support member 24. The fixtures 32A-32D are adapted to retain the seats 22A, 22B when the seats are unrolled and pulled laterally inward toward the fixtures 32A-32D, as indicated by the directional arrows C1, C2, D1 and D2, shown in FIG. 2. The seats 22A-22B may have J-bars or other connecting features along the laterally inward edges that are configured to attach to the fixtures 32A-32D to retain the seats 22A, 22B in the deployed position shown in FIGS. 2 and 3. Such a J-bar feature is described below with respect to the embodiment of FIGS. 4-8.

As shown in FIG. 2, a headrest 34 is actuated to pivot into a use position, such as by actuating from the roof (shown with respect to the embodiment of FIG. 5), or from the adjacent vehicle sidewall or center structure, such as support member 24. Referring to FIG. 3, the seats 22A, 22B are shown inflated in the deployed position. This may be accomplished either via an actuator valve that automatically draws air into the seats 22A, 22B when the seats 22A, 22B are unrolled to the deployed position, or via a hand held pump attachable to the valve. The seats 22A, 22B may be filled with pneumatic foam for comfort. Exemplary pneumatic foam shown in FIG. 5 with respect to seat 122 could be used in the same manner in seats 22A, 22B. When the seats 22A, 22B are retracted to the stowed position, the air may be automatically expelled by pressure from the roller mechanisms 28A, 28B.

In an alternative embodiment, the locations of the roller mechanisms 28A, 28B and the fixtures 32A-32D may be switched, with the roller mechanisms 28A, 28B secured to the floor 12 and the support member 24, and with the fixtures 32A-32D secured to the side trim panels 14A, 14B. In yet another alternative embodiment, the seats 22A, 22B may be sling-type, non-inflatable fabric panels. The roller mechanisms 28A, 28B and the fixtures 32A, 32B may be configured to be movable between multiple positions. For example, the roller mechanisms 28A, 28B containing the seat back portions 36A, 36B may be movable on locking bars that lock to the side trim panels 14A, 14B in three different positions, thus establishing multiple seat back positions.

Figure 4:
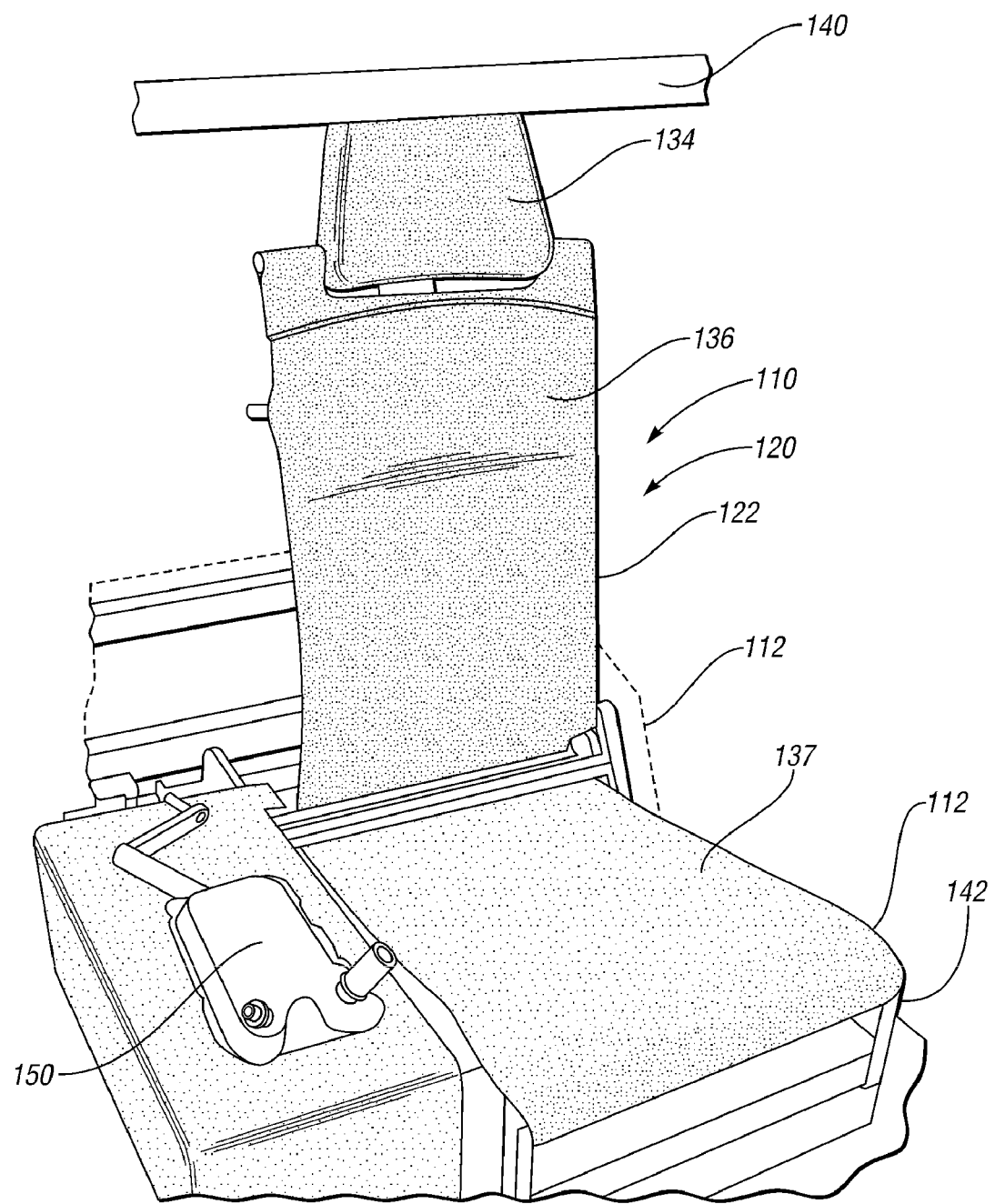
FIG. 4 is a schematic perspective illustration in fragmentary view of another embodiment of a vehicle with an on-demand seat.
Figure 5:
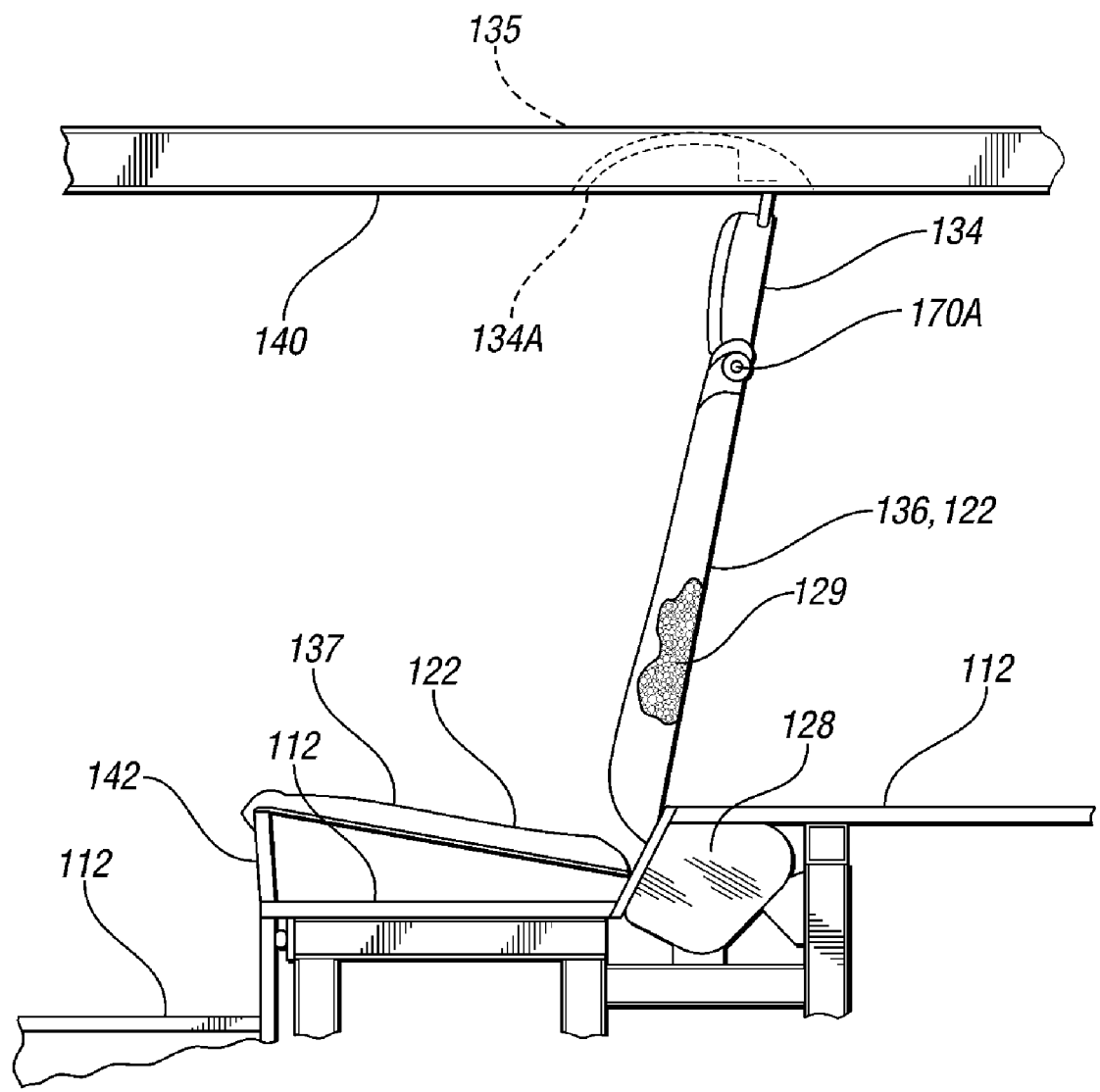
FIG. 5 is a schematic illustration in fragmentary side view of the vehicle and seat of FIG. 4, showing the headrest in phantom in a stowed position in the roof, and partially fragmented to show pneumatic foam inside the seat.
Figure 6:
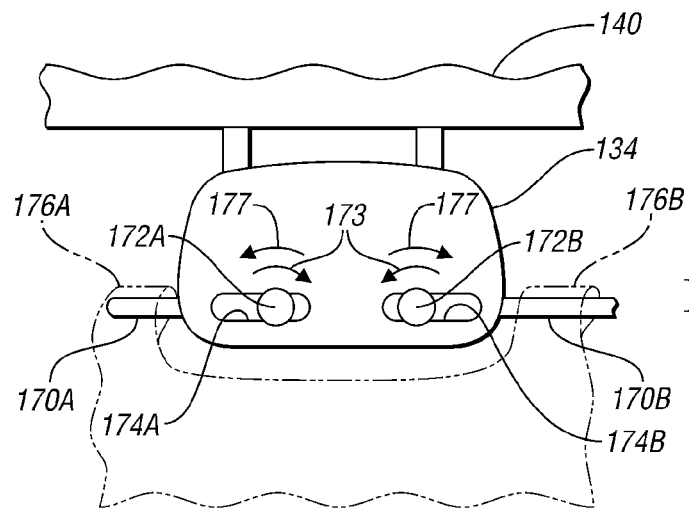
FIG. 6 is a schematic illustration in fragmentary rear view of the headrest of the vehicle of FIGS. 4 and 5 in a use position with the seat back shown in phantom suspended from the headrest.

Another embodiment of a vehicle 110 is shown in FIG. 4 with a seat assembly 120 including a seat 122 that is shown in a deployed position. Although only one seat 122 is shown, additional like seats may be provided to form a row of two such seats, or multiple rows. The seat 122 is suspended from vehicle body structure, such as a roof 140 that includes a headrest 134 pivotably connected thereto. The headrest 134 is shown in FIGS. 4-6 in a use position. The headrest 134 may be pivoted to a stowed position, shown in phantom as 134A in FIG. 5, when the seat 122 is stowed. In the stowed position, the headrest 134 is nested in a cavity 135 formed in the roof 140. In the deployed position, the seat back portion 136 of seat 122 is suspended from the headrest 134, and the seat bottom portion 137 of the seat 122 is secured to a locking element 142 (best shown in FIG. 8) that is pivoted to a locked, use position. A floor 112 of the vehicle 110 is shown partially in solid, with a removed portion shown in phantom. The vehicle body structure including roof 140 and floor 112 are shown only schematically, but should be understood to be representative of any vehicle body structure. The body structure also includes side trim panels that are removed from FIGS. 4-8 for clarity.

Figure 7:
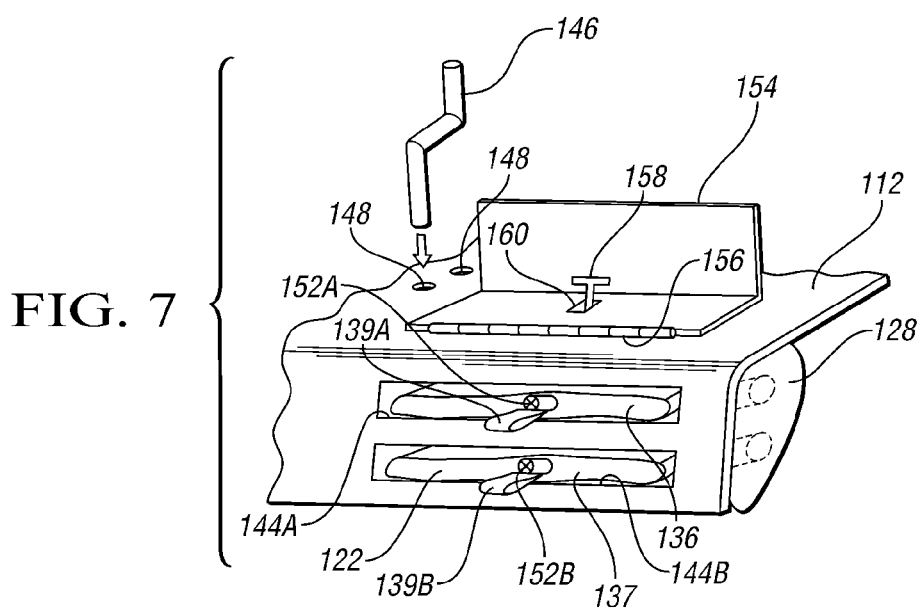
FIG. 7 is a schematic illustration in fragmentary perspective view of the floor of the vehicle of FIGS. 4-6 with the seat refracted by a roller mechanism under the floor.

The seat 122 is operatively connected to a roller mechanism 128 (shown in FIGS. 5 and 7) mounted under the floor 112. The roller mechanism 128 may include separate rollers for the seat back 136 and the seat bottom 137. For example, the seat back 136 and seat bottom 137 may be separate, non-integral components. FIGS. 4 and 5, the seat 122 is in a deployed position, extending through slots 144A, 144B (best shown in FIG. 7) in the floor 112. Referring to FIG. 7, the seat 122 is retracted through the slots 144A, 144B by the roller mechanism 128 to be stowed under the floor 112 when in the stowed position. A hand crank 146 shown in FIG. 7 is connected with the roller mechanism 128 through an opening 148 in the floor 112 to allow the seat 122 to be manually retracted to the stowed position. Alternatively, the roller mechanism 128 may be spring-loaded to automatically retract the seat back 136 and seat bottom 137. Multiple openings 148 may be provided to connect the crank 146 to the separate rollers of roller mechanism 128 for the seat back 136 and the seat bottom 137.

When deployed, the seat 122 may be inflated by connecting an inflator pump 150, shown in FIG. 4, to valves 152A, 152B in the seat back 136 and seat bottom 137 (valves shown in FIG. 7). The seat inflation may be adjusted for comfort preference by connecting the inflator pump 150 (i.e., upon initial inflation or afterward). Alternatively, the valves 152A, 152B may be configured to automatically draw in air when the seat back 136 and seat bottom 137, respectively, are extended and pressure from the roller mechanism 128 is thereby released. When the seat 122 is retracted, pressure from the roller mechanism 128 forces the air out of the seat 122. The seat 122 may be filled with pneumatic foam 129 to further increase comfort. A cover 154 connected at hinge 156 may be pivoted downward to cover the slots 144A, 144B when the seat 122 is stowed.

Figure 8:
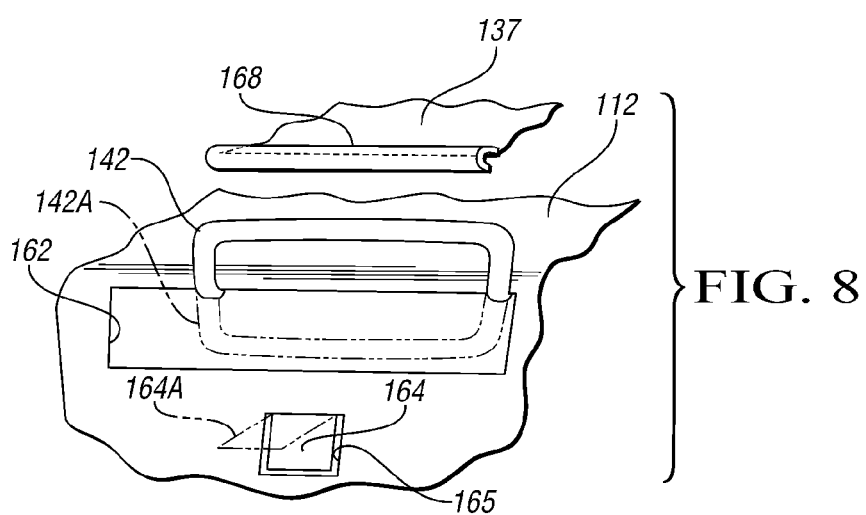
FIG. 8 is a schematic illustration in fragmentary perspective view of the floor of the vehicle of FIGS. 4-7 with a locking element in a use position and the seat bottom with a J-bar positioned to fit to the locking element.

In order to transition the seat 122 from the stowed position of FIG. 7 to the deployed position of FIGS. 4-6, the cover 154 is pivoted upward to the position of FIG. 7. A lock 158 connected to floor 112 and extending through an opening 160 in the cover may then be rotated to secure the cover 154 in the open position. Referring to FIG. 8, the locking element 142 is then rotated upward through an opening 162 in the floor 112 from a stowed position 142A to the use position. The locking element 142 is connected to the floor with a one-way ratchet to lock in the use position. The cover 154 also provides structural protection from cargo sliding forward from the rear of the passenger compartment.

Next, a release lever 164 accessible through opening 165 in the floor and connected such as by cable (not shown) to the roller mechanism 128 is pulled to position 164A (shown in phantom) to release the roller, thereby allowing the seat bottom 137 to be pulled through slot 144B. Pull tabs 139A, 139B may be provided to allow easy access to the seat back 136 and seat bottom 137 through the slots 144A, 144B. The seat back 136 and seat bottom 137 could be configured to be deployed simultaneously to reduce the number of steps to position the seat 122. A connecting feature 168, shown as a J-bar, secured to the edge of the seat bottom 137 is then slipped over the locking element 142 to secure the seat bottom 137 to the locking element 142.

Referring to FIG. 6, the headrest 134 is then pivoted to the use position. Attachment arms 170A, 170B are slid outward from cavities within the headrest 134 and secured in extended positions shown in FIG. 6 by tightening clamps 172A, 172B by twisting the clamps 172A, 172B in the respective directions shown with arrows 173. The clamps 172A, 172B extend through slots 174A, 174B in the back of the headrest 134. The release lever 164 of FIG. 4 is again pulled to release the roller connected with seat back 136 and allow the seat back 136 to be pulled through slot 144A. Referring to FIG. 6, loops 176A, 176B formed at the edge of the seat back 136 allow the seat back 136 to be suspended from the arms 170A, 170B, and thus supported by the headrest 134 and the roof 140. The connection of the headrest 134 to the roof 140 may include a multi-position feature, such as a releasable one-way ratchet, that allows the headrest 134, and thus the seat back 136 when connected thereto, to be positioned at multiple angles with respect to the seat bottom 137, at the option of the seat occupant. Once deployed, the seat 122 may then be inflated using the pump 150, as described above. In some embodiments, the seat 122 automatically inflates when deployed.

To return the seat 122 to the stowed position, the lever 164 is again pulled to release the rollers of roller mechanism 128. The connecting feature 168 is then removed from the locking element 142, and the locking element 142 is pivoted to the stowed position. The loops 176A, 176B are removed from the arms 170A, 170B and the arms 170A, 170B are slid inward into the headrest 134 after first loosening the clamps 172A, 172B by twisting in respective directions shown by arrows 177. The headrest 134 is then pivoted to the stowed position 134A. The arms 170A, 170B are again extended to slide into receiving slots (not shown) formed in the roof 140 to secure the headrest 134 within the cavity 135 in the roof 140 in the stowed position. The manual crank 146 is again used to retract the seat bottom 137 and the seat back 136 into the stowed position beneath the floor 112. Alternatively, the roller mechanisms 128 may be configured so that the seat back 136 and the seat bottom 137 automatically retract when released from arms 170A, 170B and locking element 142, respectively. Refraction of the seat back 136 and seat bottom 137 could be configured to occur simultaneously. The cover 154 is then unlocked and rotated downward to cover the slots 144A, 144B.

It should be appreciated that many variations of the embodiments shown may be used. For example, the respective floors 12 and 112 shown in the two vehicle embodiments are stepped floors having different elevations in front of and behind the respective seats 22, 122. Alternatively, a flat floor would also accommodate the seats shown. For example, the slots 144A, 144B would simply be formed in the flat floor (i.e., upward-facing slots, facing toward the roof 140), and the cover 154 would be a flat panel. The roller mechanism 128 would be angularly adjusted with respect to the position shown in FIG. 5 to allow the seat 122 to extend through the slots 144A, 144B. Also, the locking element 142 would be reconfigured to extend through an upwardly-facing opening in the flat floor, in lieu of opening 162.

In each of the embodiments, the seats 22A, 22B, 122 do not include frame structure; rather, the vehicle body structure, such as floor 12, 112, side trim panels 14A, 14B and roof 140, serve as a frame for the seats 22A, 22B, 122 with the seats 22A, 22B, 122 suspended from and supported by the body structure. In either embodiment, the seats 22A, 22B may be inflatable, or may be sling-type, non-inflatable seats.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   body structure at least partially defining a passenger compartment and including side panels and a floor;
   a support member spaced from the side panels, supported by the floor, and pivotable from a stowed position substantially along or within the floor and a deployed position extending further from the floor; and
   a seat configured to be connected to the support member to establish the deployed position and thereby span the space between the support member and one of the side panels in the deployed position, and to be retracted within the side panel in the stowed position.

2. The vehicle of claim 1, wherein the seat is characterized by the absence of a frame.

3. The vehicle of claim 1, wherein the seat is inflatable in the deployed position.

4. The vehicle of claim 1, further comprising:
   a battery tunnel forward of the support member.

5. The vehicle of claim 1, further comprising:
   a roller mechanism mounted to the body structure and configured to roll the seat into the stowed position and to unroll the seat to the deployed position.

6. The vehicle of claim 1, further comprising:
   at least one fixture mounted to the support member and configured to retain the seat to the support member in the deployed position.

7. The vehicle of claim 1, wherein the seat is pneumatic foam.

* * * * *